Aug. 29, 1944.  A. O. WILLIAMS  2,356,962
SPRING UNIT
Filed Aug. 1, 1941
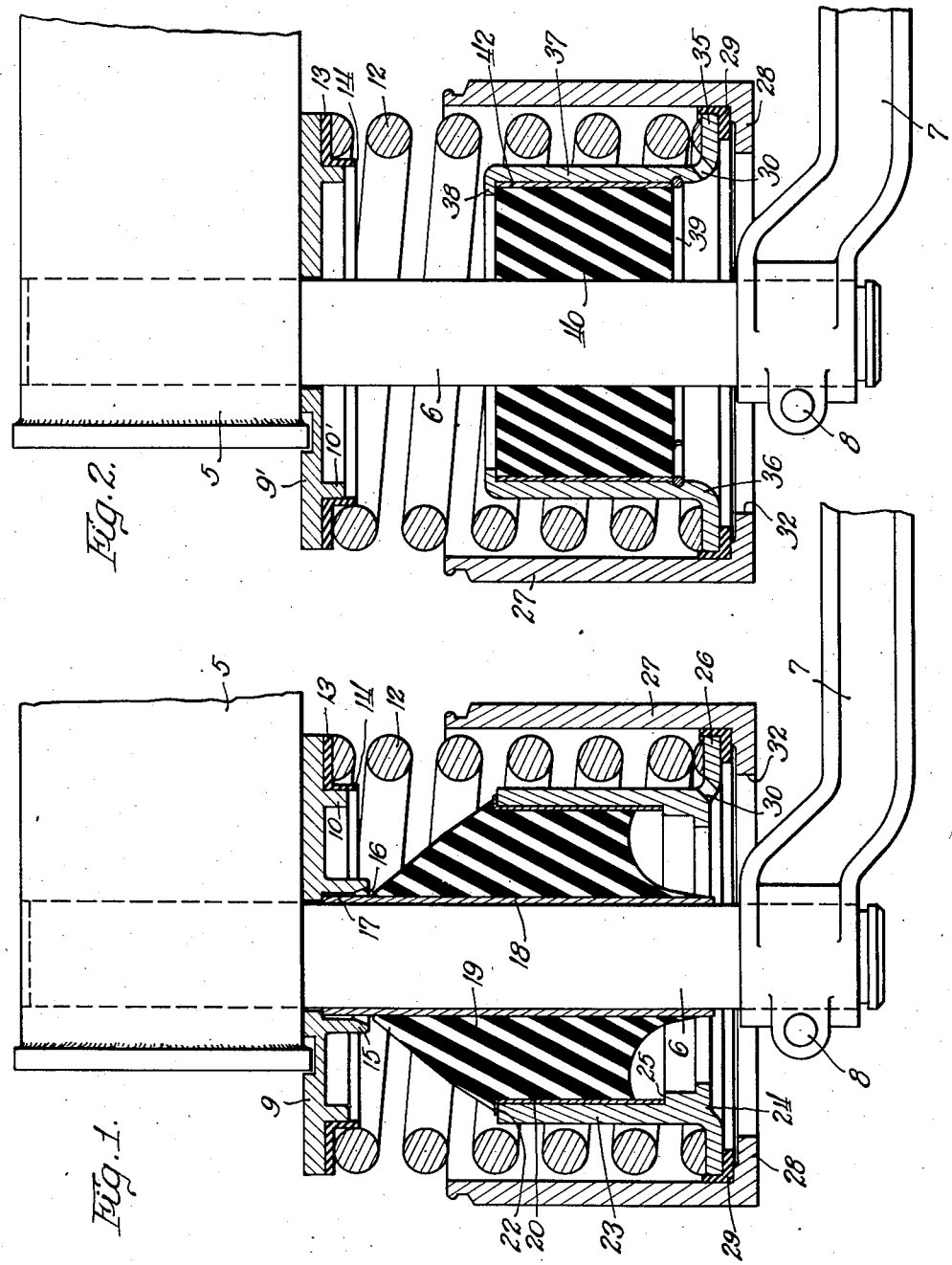
INVENTOR.
Alfred O. Williams.
BY Walter E. Schirmer
Atty.

Patented Aug. 29, 1944

2,356,962

UNITED STATES PATENT OFFICE 2,356,962

SPRING UNIT

Alfred O. Williams, Battle Creek, Mich., assignor to Clark Equipment Company, Buchanan, Mich., a corporation of Michigan Application August 1, 1941, Serial No. 404,988

2 Claims. (Cl. 267—3)

This invention relates to spring units, and more particularly is directed to a spring unit used on rail car trucks and the like, such as resilient supports for center bolsters, wheel journals and the like.

I am familiar with various types of spring units heretofore employed in trucks of this nature, including the friction type of shock absorbing unit, the dashpot type and the rubber spring unit in which steel plates are vulcanized to concentric rubber annuli, and produce progressive loading on the rubber as the load on the vehicle increases.

The present invention is a modification and improvement of the construction shown in my Reissue Patent #21,612, issued October 29, 1940, and is directed particularly to a spring unit assembly, which overcomes the disadvantages inherent in other types of assemblies with which I am familiar, one of the primary characteristics being the combination of a coiled steel spring for absorbing all or substantially all of the vertical loading on the spring unit with a rubber element utilized mainly for resisting lateral thrust loads to prevent such loads being imposed upon the steel spring. Thus the spring is so designed that the lateral stability is accommodated in the rubber portion of the spring with the vertical loading being taken by the steel spring which is arranged annularly about the rubber.

By employing rubber for lateral stability, the possibility of metal to metal contact is eliminated and lateral thrust loads are accommodated between the bolster and the side frame members, or between the truck frame and the axle assemblies, thereby dampening the swaying of the car body caused by irregularities in the track.

Another feature of the present invention is to provide a construction and arrangement of parts which facilitates inspection, maintenance and repair of the unit, and allows ready replacement of the elements, which may be required due to wear and the like.

Other objects and advantages of the present construction will appear more fully to those skilled in the art from the following detailed description, which, taken in conjunction with the accompanying drawing, will disclose the particular construction and operation of the preferred form of the present invention.

In the drawing:

Figure 1 is a vertical sectional view through a spring assembly embodying one form of the present invention; and Figure 2 is a corresponding view of another form of the present invention.

Referring now in detail to the drawing, in Figure 1, I have provided the side frame member or the like, indicated at 5, which has secured therein the depending pedestal post 6 of tubular form, this post having secured to the lower end thereof the journal bar 7 by means of split clamps or the like indicated at 8. The journal bars 7 connect the depending pedestal post 6 on opposite sides of the axle assembly at one end of the truck frame, and a pair of spring units is provided for each of the axle assemblies at each side of the truck. A suitable thrust plate or similar member 9 is provided about the upper part of the post 6 where it projects from the side frame member 5, the under-surface of the plate 9 having the annular flange 10 forming a seat for receiving the upper end of a coiled steel spring member 12. The end coil of the spring member 12 is insulated from the plate 9 by the use of a flanged fiber insulator 13 which is provided with the cylindrical flange portion 14 to prevent metal to metal contact between the plate 9 and the spring 12. About the annular surface of the post 6 the plate 9 is provided with an axially extended flange 15 having its outer end tapered, as indicated at 16, for a purpose to be described hereinafter.

The flange 15 defines an annular recess about the post 6 within which is received the upper end 17 of a sleeve member 18 closely fitting about the post 6.

The sleeve member 18 has bonded to its external annular surface the annular rubber ring or buffer member 19 which decreases in vertical extent from its inner to its outer periphery. The outer surface of the rubber member 19 is bonded to a second annular sleeve member 20, which is provided with the radially out-turned flange 22 seating on the top of the hub portion 23 of a support 24. The lower end of the sleeve 20 seats on the shoulder 25 formed internally of the support, and the support 24 is provided with a radially outwardly directed flange 26 at its lower end, which annular flange seats in the spring pot 27 carried by the axle assembly. The spring pot 27 has the internal flange 28 at its lower end forming a seat for the support 24, the support preferably being insulated from the spring pot 27 by means of the fiber insulator 29. The support 24 is also provided with circumferentially spaced openings 30 allowing drainage therethrough into the opening 32 in the bottom of the spring pot. These openings 30 allow any moisture or dirt which collects between the hub portion 23 of the support and the spring pot 27 to be discharged downwardly through the bottom opening in the spring pot.

It will be apparent that when the vehicle has substantially no passengers, the rubber member 19 will be subjected to no vertical loading, and any vertical oscillations will be taken care of by the spring 12. The spring 12 is a conventional type of helically coiled spring which has a substantially uniform deflection rate. Lateral oscillations occurring under this unloaded condition will be resisted solely by the rubber 19, since the rubber will be compressed upon lateral oscillations before such oscillations will be transmitted to the spring 12. By employing a rubber ring of this type, it is apparent that the spring 12 will not be subject to oscillations which might tend to cause it to rub against either the hub 23 of the support or against the inner annular surface of the spring pot. Thus, under no circumstances will the spring 12 have to resist lateral thrust loads.

When the vehicle is loaded, it will be apparent that the frame member 5 will be depressed relative to the spring pot 27, and consequently vertical load will be imposed upon the rubber member 19 due to the abutment of the upper end 17 of sleeve 18 against the radial shoulder of the plate 9 formed within the flange 15. This causes an axial loading on the sleeve 18, and due to the bonding of the rubber thereto, the rubber will be stressed in shear since its outer annular surface is supported in the hub of the support 24. Consequently, under such conditions the rubber will be subjected to some vertical loading. Since the spring 12 is of materially greater stiffness than the rubber member 19, however, the spring 12 will support the major portion of the vertical loading and the rubber 19 again will be used to absorb lateral oscillations and prevent their transmission to the spring 12. With this construction it will be apparent that the sleeve 18 moves conjointly with the post 6 during vertical movement of the side frame member 5 relative to the spring pot. This is to avoid any metal to metal slippage between the sleeve and the post, which would result in wear therebetween and might produce noise or squeaking.

In Figure 2 an improvement in the construction has been disclosed in which the rubber element of the spring unit is subjected to no vertical loading whatever without in any way sacrificing the elimination of any metal to metal contact in the unit. In this form of invention, the cross frame member 5 is provided with the vertical boss 6 and the journal bar 7 in the manner previously described. The thrust plate 9', however, in this form of the invention is provided only with the flange 10' for receiving the upper end of the spring 12, and has no center flange corresponding to the flange 15. The spring pot 27 is the same as that described in connection with Figure 1, and is adapted to receive the flanged portion 35 of a support 36, this support having the cylindrical upwardly extending hub portion 37 provided with the inturned radial flange 38 at the upper end thereof. Secured in the hub 37 between the flange 38 and the snap ring 39 is a rubber element 40 having bonded to the external annular surface thereof the metal sleeve or ring 42. Thus it will be seen that the rubber member 40 is securely locked against any vertical movement relative to the hub 37 of the support 36.

In this form of the invention it will be apparent that the rubber member 40 directly embraces the post 6, there being only a slight clearance therebetween. The rubber, however, is so formed that it has the characteristic of being sufficiently flexible so that as the post 6 moves downwardly relative thereto under loading in the vehicle, the rubber will creep along the annular surface of the post 6 and will center itself into position. Thus, as the journal post rises and falls, the rubber creeps along the surface thereof and finds its own centering position, thereby not retarding the movement of the post 6 in any manner, nor at the same time producing any positive displacement of the rubber element 40. It is to be understood, of course, that the rubber must be of sufficient hardness to receive and absorb the lateral thrust loads thereon, and I have found that a rubber having a durometer rating of from 50—55 possesses the desired characteristics since it will deflect only about $3/8$ of an inch under a load of 600 pounds, and still is sufficiently flexible so that the friction between the post 6 and the inner annular surface of the rubber is not sufficiently great to prevent it creeping back from a distorted position, due to rising or falling of the center post, into proper centering position.

With this construction, the steel spring 12 absorbs only vertical loads and the rubber member 40 absorbs only lateral loads. Consequently each of these elements functions independently of the other regardless of the vehicle, the steel spring taking care of relative vertical movement between the spring pot and frame and the rubber member taking care of relative lateral movements between these elements.

Here again the steel spring is insulated by means of fiber members from the plate 9' and from the spring pot 27. This is to prevent the passage of current from the rails through the spring pots up into the frame of the truck.

It will be apparent that with respect to both Figures 1 and 2, it is a simple matter to remove the rubber members if they require replacement or repair. The same is true with respect to the electric steel spring members 12. Consequently, maintenance of this type of spring is greatly facilitated and the spring may be assembled readily into position after repair or replacement.

It is understood that various changes may be made in certain details of the present construction without in any way affecting the underlying principles embodied in the present invention, and I therefore do not intend to be limited except as defined by the scope and spirit of the appended claims.

I claim:

1. In a rail truck, a frame member having a depending post, a thrust plate about said post, a housing member encircling said post below said thrust plate, a helically coiled metal spring biased between said thrust plate and the lower end of said housing, a resilient buffer ring encircling said post within said housing and having its outer peripheral surface supported laterally and vertically from said housing, internal sleeve means on said ring embracing said post, and means on said post engaging said sleeve means for conjoint vertical movement therewith said sleeve means transmitting lateral reactions of said post member radially into said ring.

2. In a spring assembly, a first movable member including a depending post, a thrust flange encircling said post adjacent one end thereof and having a depending cylindrical collar about said post and spaced radially therefrom, a second movable member encircling said post, said members having relative vertical movement, a helically coiled spring biased between said thrust plate and said second member, means in said second member forming an annular hub radially spaced about said post, a rubber buffer ring having internal and external metallic sleeves bonded thereto, said external sleeve being supported in said hub member, said internal sleeve being biased at one end against said thrust member within said annular collar and closely engaging said post member for conjoint downward movement therewith, said buffer ring tapering in cross section from said internal sleeve to said external sleeve, with the rubber being of such flexibility as to provide for return of said sleeve conjointly with said post from a downwardly distorted position caused by oscillation of said post.

ALFRED O. WILLIAMS.